US008667010B2

(12) United States Patent
Wu et al.

(10) Patent No.: US 8,667,010 B2
(45) Date of Patent: Mar. 4, 2014

(54) DATABASE TABLE PARTITIONING ALLOWING OVERLAPS USED IN FULL TEXT QUERY

(75) Inventors: Enyuan Wu, Bellevue, WA (US); Alan K. Michael, Monroe, WA (US); Wootaek Seo, Mercer Island, WA (US); Beom Seok Oh, Sammamish, WA (US)

(73) Assignee: Microsfot Corporation, Redmond, WA (US)

( * ) Notice: Subject to any disclaimer, the term of this patent is extended or adjusted under 35 U.S.C. 154(b) by 0 days.

(21) Appl. No.: 13/360,052

(22) Filed: Jan. 27, 2012

(65) Prior Publication Data

US 2013/0198218 A1 Aug. 1, 2013

(51) Int. Cl.
*G06F 7/00* (2006.01)

(52) U.S. Cl.
USPC .......................................................... 707/769

(58) Field of Classification Search
USPC .................................. 707/968, 969, 792, 793
See application file for complete search history.

(56) References Cited

U.S. PATENT DOCUMENTS

| | | | | |
|---|---|---|---|---|
| 5,551,027 A * | 8/1996 | Choy et al. | ............................ | 1/1 |
| 6,931,390 B1 | 8/2005 | Zait et al. | | |
| 7,171,399 B2 | 1/2007 | Kapoor et al. | | |
| 7,809,195 B1 * | 10/2010 | Greene | ........................ | 382/181 |
| 7,949,687 B1 | 5/2011 | Sinclair | | |
| 8,082,273 B2 * | 12/2011 | Brown et al. | ................. | 707/782 |
| 8,146,058 B2 * | 3/2012 | Sarkar et al. | .................. | 717/124 |
| 2002/0123993 A1 * | 9/2002 | Chau et al. | ........................ | 707/5 |
| 2006/0126725 A1 * | 6/2006 | Zeng et al. | ................ | 375/240.03 |
| 2006/0218123 A1 * | 9/2006 | Chowdhuri et al. | .............. | 707/2 |
| 2007/0239797 A1 | 10/2007 | Cattell et al. | | |
| 2008/0050047 A1 * | 2/2008 | Bashyam et al. | ............. | 382/305 |
| 2008/0177994 A1 * | 7/2008 | Mayer | .............................. | 713/2 |
| 2008/0228783 A1 | 9/2008 | Moffat | | |
| 2010/0281013 A1 * | 11/2010 | Graefe | .......................... | 707/715 |
| 2011/0231447 A1 * | 9/2011 | Starkey | ......................... | 707/792 |

OTHER PUBLICATIONS

"19 Using Explain Plan", Retrieved at <<http://docs.oracle.com/cd/B19306_01/server.102/b14211/ex_plan.htm>>, Retrieved Date: Nov. 30, 2011, pp. 26.

"18 Partitioned Tables and Indexes", Retrieved at <<http://docs.oracle.com/cd/B19306_01/server.102/b14220/ partconc.htm>>, Retrieved Date: Nov. 30, 2011, pp. 15.

* cited by examiner

*Primary Examiner* — James Trujillo
*Assistant Examiner* — Linh Black
(74) *Attorney, Agent, or Firm* — Wolfe-SBMC

(57) ABSTRACT

Various embodiments provide a set of algorithms and scripts, e.g., SQL scripts, to perform automatic horizontal table and index partitioning that allows overlapping of data records, used in full-text search queries. In at least some embodiments, table creation and populating script is utilized to create a set of smaller tables partitioned by one column. In at least some embodiments, SELECT query modification script is provided to generate a query that works on the partitioned tables to achieve better performance. In at least some other embodiments, other query creation script is provided to modify the INSERT/UPDATE/DELETE queries for the original large table to automatically keep these queries synchronized with partitioned tables.

18 Claims, 10 Drawing Sheets

| Count | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| 1 | 1 | 2 | 3 | 4 | | | | | | | | | | | | | | | | | | |
| 2 | | 2 | 3 | 4 | 5 | 6 | 7 | | | | | | | | | | | | | | | |
| 3 | | | | 4 | 5 | 6 | 7 | 8 | 9 | | | | | | | | | | | | | |
| 4 | | | | | | 6 | 7 | 8 | 9 | 10 | 11 | | | | | | | | | | | |
| 5 | | | | | | | 7 | 8 | 9 | 10 | 11 | 12 | 13 | 14 | | | | | | | | |
| 6 | | | | | | | | | 9 | 10 | 11 | 12 | 13 | 14 | 15 | 16 | | | | | | |
| 7 | | | | | | | | | | | 11 | 12 | 13 | 14 | 15 | 16 | 17 | 18 | | | | |
| 8 | | | | | | | | | | | | | 13 | 14 | 15 | 16 | 17 | 18 | 19 | 20 | 21 | 22 |

Fig. 7

DATABASE TABLE PARTITIONING ALLOWING OVERLAPS USED IN FULL TEXT QUERY

COMPUTER PROGRAM LISTING APPENDIX

A computer program listing appendix containing code of a computer program that may be used with the present invention is incorporated herein by reference in its entirety and appended hereto as one original compact disk, and an identical copy thereof, each containing a total of two files as follows:

| File Name | Date of Creation | Size (Bytes) | Size on Disk (Bytes) |
|---|---|---|---|
| Generated Stored Procedure | Oct. 1, 2013 | 41668 | 43008 |
| Generated Procedure uspFullTextSearch( . . . ) | Oct. 1, 2013 | 23060 | 24576 |

BACKGROUND

In database systems, partitioning large tables (and the associated indexes) as by dividing and storing tables into smaller constituting elements can provide better performance, manageability, and availability for database management systems. However, there exists limitations to table partitioning, particularly in the context of full-text search queries where overlapping of partitioned tables is desired.

SUMMARY

This Summary is provided to introduce a selection of concepts in a simplified form that are further described below in the Detailed Description. This Summary is not intended to identify key features or essential features of the claimed subject matter.

Various embodiments provide a set of algorithms and scripts, e.g., SQL scripts, to perform automatic horizontal table and index partitioning that allows overlapping of data records, using full-text search capabilities.

In at least some embodiments, table creation and populating script is utilized to create a set of smaller tables partitioned by one column. In at least some embodiments, SELECT query modification script is provided to generate a query that works on the partitioned tables to achieve better performance. In at least some other embodiments, other query creation script is provided to modify the insert/delete/update queries for the original large table to automatically keep the partitioned tables synchronized.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 7 is an illustration of synchronized SQL script generating algorithm in accordance with one or more embodiments.

DETAILED DESCRIPTION

Overview

Figure 1:
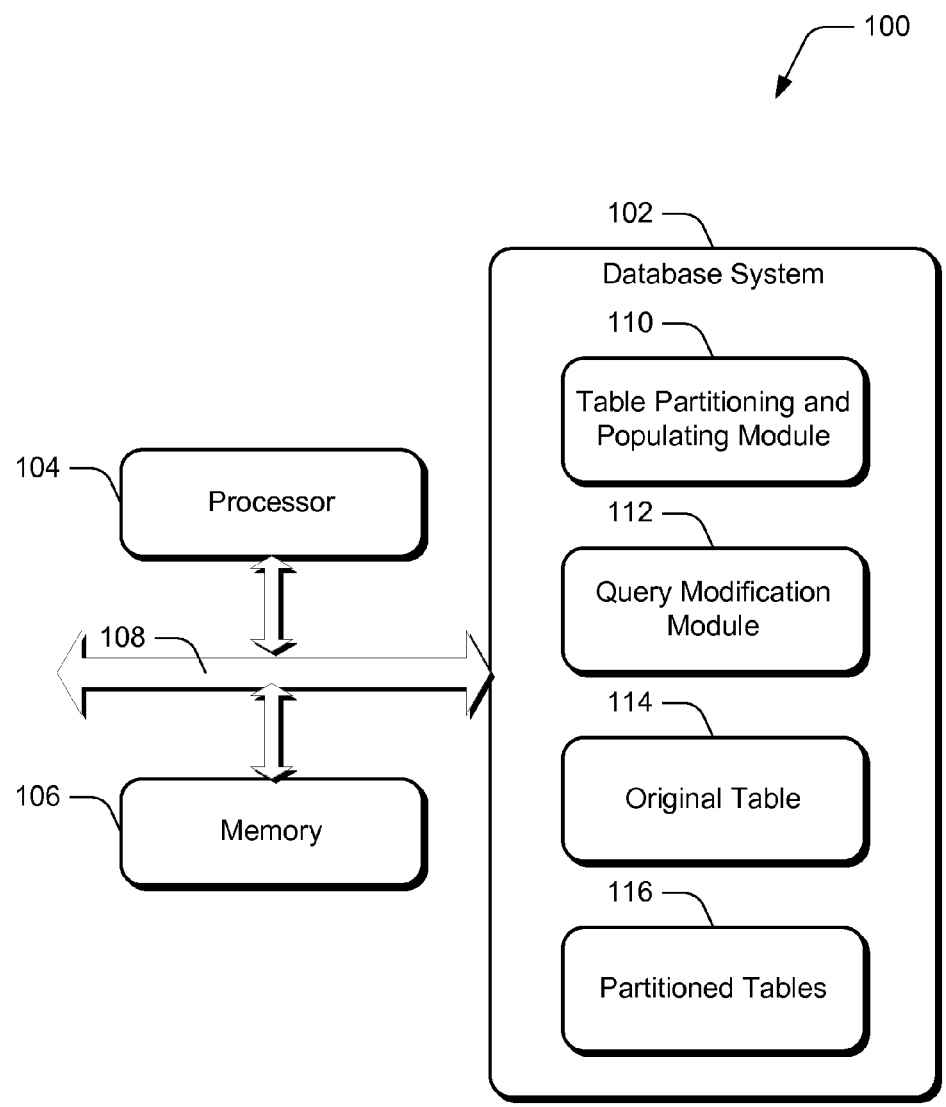
FIG. 1 is an illustration of an environment in an example implementation in accordance with one or more embodiments.

Various embodiments provide a set of algorithms and scripts, e.g., SQL scripts, to perform automatic horizontal table and index partitioning that allows overlapping of data records, used in full-text search capabilities, among other areas.

In at least some embodiments, table creation and populating script is utilized to create a set of smaller tables partitioned by one column. In at least some embodiments, SELECT query modification script is provided to generate a query that works on the partitioned tables to achieve better performance. In at least some other embodiments, other query creation script is provided to modify the insert/delete/update queries for the original large table to automatically keep these queries synchronized with partitioned tables.

Some commercially available database management systems have provided partition functions and partition schemes, to facilitate index and table partitioning However, there are some limitations in the out-of-box partitioning functionality.

Specifically, overlap is not allowed in horizontal partitioning, whereas sometimes overlapping is desired. For example, if daily sales data is partitioned by month, there is no easy way to query weekly sales, without some overlapped sales data from the previous and the next months.

Besides, in these systems, there is no mechanism to facilitate SQL statements to perform queries on specific partitioned tables, and database engines determine the specific partitioned tables at run-time, thus resulting in erosion of the performance gain due to this overhead. Further, other data operations such as INSERT, DELETE, and UPDATE are manually maintained. Moreover, a special type of SQL queries—the SQL full-text search queries—cannot easily take advantage of table partitioning, due to considerable complexity added to coding and maintenance. Other queries can narrow down the search scope by using a WHERE clause. For example, if one wishes to retrieve all sales data in Europe with an order amount greater than $1,000, one can simply limit the region to Europe first then query the order amount >$1,000. However, in SQL full-text search queries, even if one knows the targeted results will have a word count ranged from 40 to 50, there is no way to limit the scope of potential candidates to that word count range. Instead, all records need to be searched, then the word count range can be used to narrow down the result set.

In the illustrated and described embodiments, there are three aspects that are utilized to promote table partitioning that allows for overlaps. First, a set of smaller tables partitioned by one (or more) column are created and populated. Second, a query is generated that works on the partitioned tables to achieve desired performance benefits. Third, the insert/delete/update queries are modified for the original large table to automatically keep these queries synchronized with partitioned tables.

For context, consider the following sample table and full-text query. The sample table [StringData_en-us] is a full-text index enabled table that stores large numbers of records to perform full-text queries. In this example, the table has following columns (and is shown just below):

StringDataId—an integer key field of the table;
String—a text field to store the actual string; full-text index is enabled on this field;
StringHash—an optional field to check the uniqueness of the string; normal (non full-text) index is enabled on this field;
WordCount—number of words in the string.

SAMPLE TABLE

| StringData_en-us | |
|---|---|
| PK | StringDataId |
| | String |
| | StringHash |
| | WordCount |

Some sample data that appear in the table is shown just below:

| String Data Id | String | String Hash | Word Count |
|---|---|---|---|
| 101 | OK | 0x9CE3BD4224C8C1780DB56B4125ECF3F24BF748B7 | 1 |
| 102 | Cancel | 0x77DFD2135F4DB726C47299BB55BE26F7F4525A46 | 1 |
| 103 | Turn on Toggle &Keys | 0xD639DE40EAC45ED5918B55D3808073BF30BDC77F | 4 |
| 104 | Turn on Toggle Keys by holding down the NUM LOCK key for &5 seconds | 0xF53855C0491FECF09207F31F93023C98EF4F8D13 | 14 |
| 105 | Ignore or slow down brief or repeated keystrokes and adjust keyboard repeat rates. | 0xA69058DE7227708893CDBC7214847DE3EB7F3D62 | 13 |
| 106 | Turn on F&ilter Keys | 0xD323E393C52DF7CE1B8E6EE7F3F457A30FE3DF0F | 4 |
| 107 | Authentication Mode: | 0xCAC808BE5984A8E1AA677E67A09F90B4E5E0E086 | 2 |
| 108 | U&nderline keyboard shortcuts and access keys | 0xE5DDDCA2807D58488D7AC31150330B191706E006 | 6 |
| 109 | Make it easier to use keyboard shortcuts | 0x4EB73CD2C30784C5F80B5A34708720675AD5E583 | 7 |
| 110 | Turn on Filter &Keys when right SHIFT is pressed for 8 seconds | 0x510916207458374A0FE923AF517CEC4A90F6CD9B | 12 |

Consider now a full text query example. The sample table is usually used to search for similar strings for an input string (source string), sorted by similarity rank in descending order. Below is a sample query:

SELECT f.Rank, 'Return to the Ease of Access home pages' as [Source String], d.String AS [Matched String]
FROM FREETEXTTABLE ([StringData_en-us], String, 'Return to the Ease of Access home pages', 15) f
INNER JOIN [StringData_en-us] d ON f.[Key]=d.StringDataId WHERE f.rank>100

The result of this query is shown just below:

| Rank | Source String | Matched String |
|---|---|---|
| 427 | Return to the Ease of Access home pages | Return to the Ease of Access home page. |
| 175 | Return to the Ease of Access home pages | Go to the Ease of Access Center to disable the keyboard shortcut |
| 158 | Return to the Ease of Access home pages | When using keyboard shortcuts to turn Ease of Access settings on: |
| 144 | Return to the Ease of Access home pages | Ease of Access Center |
| 144 | Return to the Ease of Access home pages | Ease of Access Administrative Settings |
| 144 | Return to the Ease of Access home pages | Ease of access control panel |
| 144 | Return to the Ease of Access home pages | Ease of access |
| 144 | Return to the Ease of Access home pages | Ease of Access |
| 144 | Return to the Ease of Access home pages | Let Windows suggest Ease of Access settings |
| 144 | Return to the Ease of Access home pages | Services and Ease of Access applications |
| 144 | Return to the Ease of Access home pages | Ease of Access applications |
| 140 | Return to the Ease of Access home pages | Open &home page for new tabs instead of a blank page |
| 140 | Return to the Ease of Access home pages | Open home page for new tabs instead of a blank page |
| 133 | Return to the Ease of Access home pages | Use a Connected account to access your home computer when you're not home |
| 132 | Return to the Ease of Access home pages | <a href="#ReportTop" title="Return to top of page"> Return to top of page... </a> |

Here, we are searching for source string "Return to the Ease of Access home pages". The exact same string does not exist in the table. However, the SQL server full-text engine finds other strings similar to our source string. Notice that the first candidate with a rank of 427 is very close to what we are searching for, but not exactly identical.

To get the above result, we first need to call a table-valued function (which is part of the SQL Server Full-text engine):
FREETEXTTABLE (table, column_name, 'freetext_string', top_n_by_rank)

Where:
table—the name of the table that has been marked for full-text querying.
column_name—the name of one or more full-text indexed columns in the table.
freetext_string—text to search for in the column_name. Any text, including words, phrases or sentences, can be used. Matches are generated if any term or the forms of any term is found in the full-text index.
top_n_by_rank—specifies that only the n highest ranked matches, in descending order, are returned.

The result of this call is given by in the following table:

| Key | Rank |
|-----|------|
| 223 | 427 |
| 201803 | 175 |
| 206 | 158 |
| 31 | 144 |
| 269 | 144 |
| 289 | 144 |
| 12204 | 144 |
| 214286 | 144 |
| 214802 | 144 |
| 265348 | 144 |
| 265349 | 144 |
| 127676 | 140 |
| 129360 | 140 |
| 218447 | 133 |
| 184937 | 132 |

After this, the result is joined with the original table on the key field (StringDataId) to return the final result as shown. Note that it is not possible to query on only the selected data set. Because the only available function for this purpose—FREETEXTTABLE( . . . )—does not support the WHERE clause to limit to the smaller data set, full-text queries always search against the entire table. A WHERE clause can only be applied after the full-text query is completed. The only way to full-text search against a smaller data set is by using a horizontal table and index partition.

Further, additional margins are needed for the full-text search. A natural way to partition the table is by word count. For example, our sample input string—"Return to the Ease of Access home pages"—has word count of 8. Accordingly, it would make sense to full-text search on strings with 8 words. Since we are querying with some fuzziness, candidates with additional words or missing words can still be good matches. Therefore some margin on word count is utilized. For example, we should search strings with a word count from 7 to 9 to allow one word difference, or from 6 to 10 to allow two word differences.

This is the reason why existing SQL server table/index partitioning functions cannot not be applied easily—the overlapping of partitioned tables.

Consider now an example operating environment in which one or more embodiments can be practiced.

Example Operating Environment

FIG. 1 illustrates a computer system 100 in accordance with one or more embodiments. In this particular example, computer system 100 includes a database 102, one or more processors 104, one or more computer-readable storage media (e.g., memory 106) interconnected together by way of a communication bus 108. Any suitable type of database system 102 can be utilized. During operation of computer system 100, processor 104 processes data stored in memory 106 using computer program instructions also stored in memory 106. The data stored in memory 106 can be part of a larger collection of organized data stored in database system 102.

In one or more embodiments, database system 102 includes a table partitioning and populating module 110, a query modification module 112, an original table 114, and multiple partitioned tables 116.

In operation, as described in more detail below, table partitioning and populating module is configured to process original table 114 to create a set of smaller tables partitioned by one or more columns, as represented by partitioned tables 116. Query modification module 112 is configured to generate queries that work on and in conjunction with the partitioned tables 116, as described below in more detail. The query modification module can modify queries for the original table 114 to automatically keep these queries synchronized with the partitioned tables 116, as will become apparent below.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices.

In the discussion that follows, various sections describe various example embodiments. A main section entitled "Table and Index Partitioning" describes how an original table can be partitioned and indexed in accordance with one or more embodiments. This section has several subsections which describe various aspects of table partitioning Next, a section entitled "Modify the Stored Procedure that Accesses the Original Table (for SELECT)" describes how the SELECT query for the original table can be modified to work with the partitioned tables in accordance with one or more embodiments. Following this, a section entitled "Modify Stored Procedure for INSERT/DELETE/UPDATE" describes various embodiments in which queries can be modified for the original table to maintain queries synchronized with the partitioned tables. Last, a section entitled "Example Device" describes aspects of an example device that can be utilized to implement one or more embodiments.

Having described an example operating environment in which table partitioning functionality can be utilized, consider now a discussion of an example embodiments.

Table and Index Partitioning

In one or more embodiments, partitioned tables and associated scripts, e.g., SQL scripts, are created automatically, with little human intervention. In the described examples, there are several tasks for table and index partition, each of which is discussed under its own heading below: estimate average number of words in partitioned tables, calculate lower and upper boundary for each table, create partitioned tables and indexes and populate the tables, modify stored procedure that accesses the original table (for SELECT), modify stored procedure for INSERT/UPDATE, modify stored procedure for DELETE, and create script for clean-up.

Estimate Average Number of Words in Partitioned Tables

Our partition column is the "word count" column, and we wish to distribute all records evenly so that all the partitioned tables have similar performance. Normally, the total number of records divided by number of partitions would give a good average population number for each table. For full-text search queries, the full-text index size, as well as the query time, depends on the total number of words. Therefore, total number of words instead of the total number of records is used to determine the number of records each partitioned table can store, for a given number of partitions. This can be determined using the following formula:

Average words per table=(Total number of words in the original table)/(Total number of partitions)

In one implementation, the pseudo-code to accomplish this is as follows:

```
DECLARE @GrandTotal bigint, @TotalPartition int, @AvgCount bigint
SET @GrandTotal = (SELECT sum(WordCount) FROM
[StringData_en-us])
SET @TotalPartition = 30
SET @AvgCount = @GrandTotal / @TotalPartition
```

Calculate Lower/Upper Word Count Boundaries for Each Partitioned Table

This step determines the word count ranges, for each partitioned table, used by full-text search queries. Because of the all-or-none nature when populating a table with a certain word count, this step can be somewhat challenging. For example, consider a distribution of sample data by word count in the original table:

| Word Count Number | 1 | 2 | 3 | 4 | ... |
|---|---|---|---|---|---|
| Number of Records | 500 | 600 | 700 | 750 | ... |
| Total Word Count | 500 | 1,200 | 2,100 | 3,000 | ... |

Figure 2:
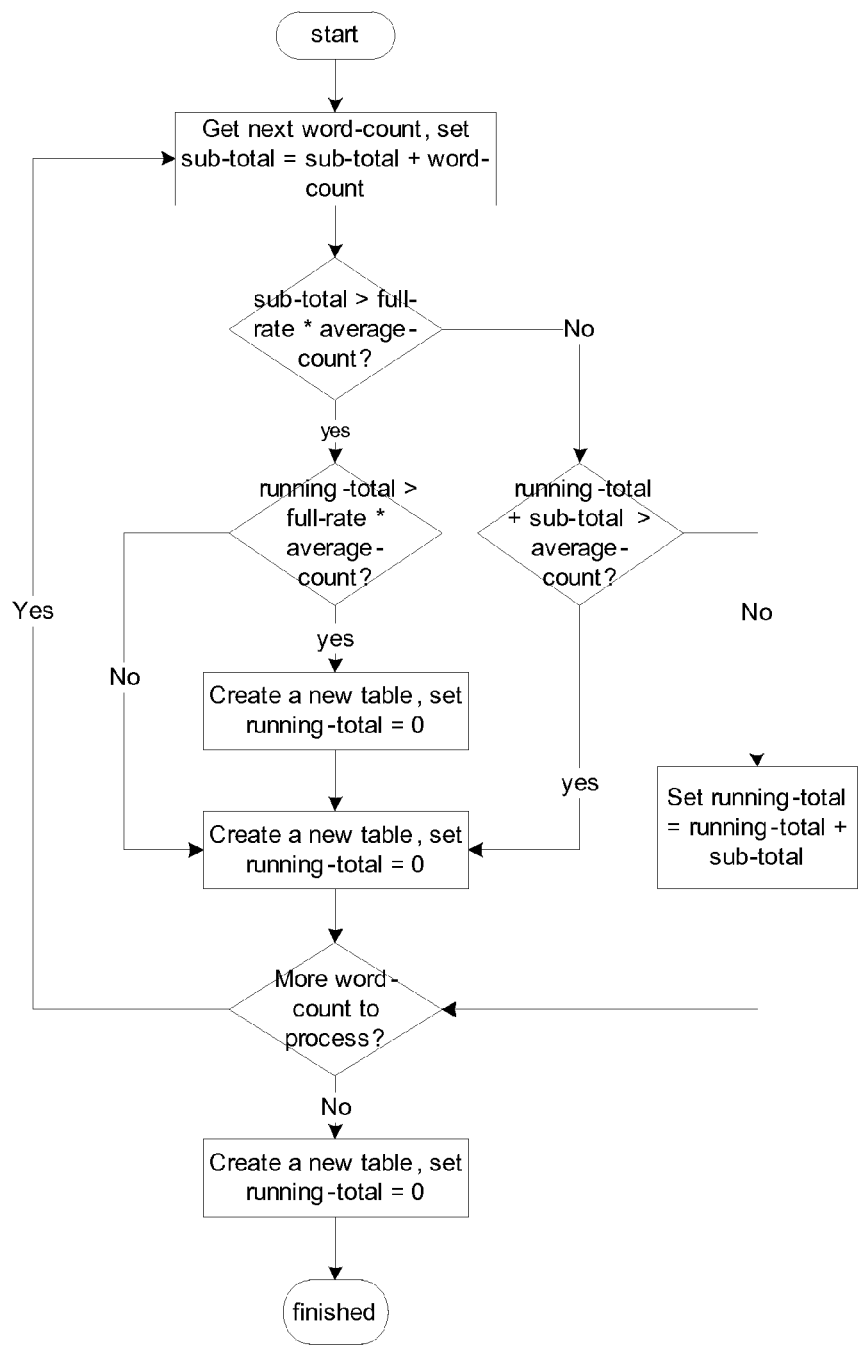
FIG. 2 is the logic flow of calculating word count (the partitioned field) boundaries for partitioned tables in accordance with one or more embodiments.

Assume the average word count for partitioned tables is 2,500, so we start adding records with word count 1 and 2 into table #1. This gives us 500+1200=1700 words. When we are at word count 3, if we add all records (2100 words) into table #1, it would be too large. If we do not add records with word count 3 (i.e., start a new table: table #2), then table #1 would not be very full. Additional logic is utilized to determine the splitting. As an example, a parameter FullRate is introduced and used to decide when to use a new partitioned table. If the percentage of total number of words dividing by the average word count exceeds FullRate, then we start a new partitioned table. For an example of detailed logic, reference is made to FIG. 2 along with the pseudo-code given as Word Count Boundary Logic positioned at the end of the description but before the claims.

Using our test database, for a total number of 35 partitioned tables, the following table has the lower and upper boundaries (the direct output of the code has one column—"Upper Bound". However, the "Lower Bound" and "Table Number" can be inferred from "Upper Bound"):

| Table Number | Lower Bound | Upper Bound |
|---|---|---|
| 1 | 1 | 2 |
| 2 | 3 | 3 |
| 3 | 4 | 4 |
| 4 | 5 | 5 |
| 5 | 6 | 6 |
| 6 | 7 | 7 |
| 7 | 8 | 8 |
| 8 | 9 | 9 |
| 9 | 10 | 10 |
| 10 | 11 | 11 |
| 11 | 12 | 12 |
| 12 | 13 | 14 |
| 13 | 14 | 16 |
| 14 | 17 | 18 |
| 15 | 19 | 20 |
| 16 | 21 | 22 |
| 17 | 23 | 25 |
| 18 | 26 | 28 |
| 19 | 29 | 31 |
| 20 | 32 | 34 |
| 21 | 35 | 38 |
| 22 | 39 | 43 |
| 23 | 44 | 49 |
| 24 | 50 | 56 |
| 25 | 57 | 65 |
| 26 | 66 | 77 |
| 27 | 78 | 91 |
| 28 | 92 | 109 |
| 29 | 110 | 131 |
| 30 | 132 | 159 |
| 31 | 160 | 197 |
| 32 | 198 | 258 |
| 33 | 259 | 330 |
| 34 | 331 | 545 |
| 35 | 546 | 1061 |

One thing to notice is that the actual total number of partitioned tables might be different from the value passed in, depending on the data distribution.

Create Partitioned Tables and Indexes, Populate the Tables

Figure 3:
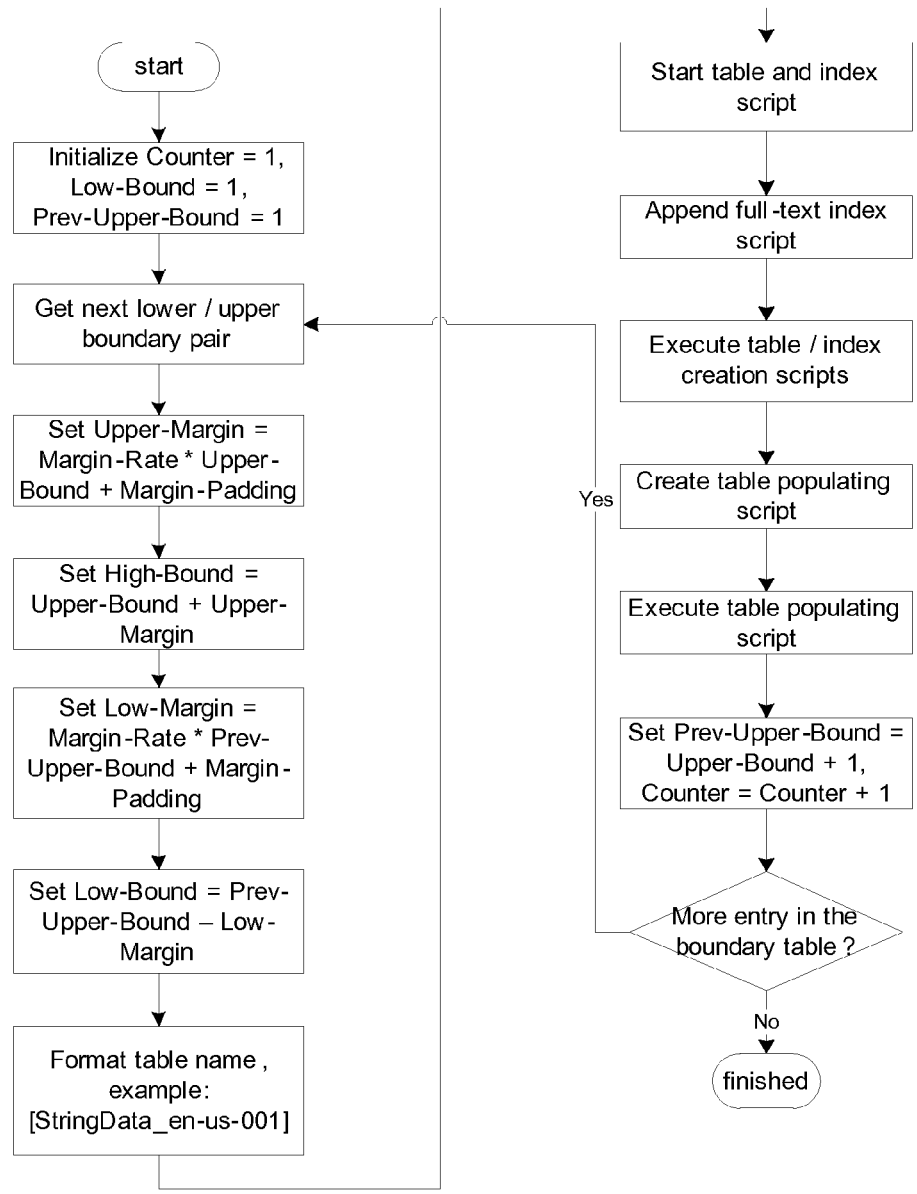
FIG. 3 is the logic flow of creating partitioned tables/indexes, and populating partitioned tables in accordance with one or more embodiments.

This step creates partitioned table structures with normal indexes and full-text indexes, and also populates these tables. For detailed logic, reference is made to FIG. 3 and the pseudo-code given as Partitioned Tables and Indexes Logic, positioned at the end of the description but before the claims.

Modify the Stored Procedure that Accesses the Original Table (for SELECT)

Now that we have the partitioned tables, these tables can be used as described below. As but one example, consider the following scenario: for a set of input strings already stored in a database table, find the best n matches ordered by similarity rank in descending order, from the original (un-partitioned) table using a full-text query. In order to accomplish this task, the following tasks will be accomplished:

(1) Declare a table-valued variable or temporary table to store the intermediate results
(2) Declare a cursor to loop through the input data that stored in a database table
(3) For each input string, do full-text query FreeTextTable( . . . ) to get a list of candidate ID's with similarity rank
(4) Join the result set from step (3) with the original (un-partitioned) table to get the candidate strings. Additionally, join to other tables to get other data
(5) Insert the result set into the table variable/temporary table from step (1)
(6) Repeat step (3) to (5) until all input records are processed
(7) Select all the resulted records from the table variable/temporary table, additional joins to other tables to get other values can be performed in this step too.

These are the minimum steps, because calling FreeTextTable( . . . ) function once for each input string is the only way to get a list of candidates with similarity rank; no joins or other set operation can replace this step.

(a) The Original SELECT Stored Procedure

Pseudo code for the original SELECT stored procedure for the un-partitioned table is given as Original SELECT Stored Procedure, positioned at the end of the desciption but before claims. For simplicity, only the full-text search query (step (3) and (4)) is listed.

Here is a sample call:

```
EXEC uspFullTextSearch
'<xmlroot><node>
<hash>0xF88CB88C184AB6F3CAA771DCBC8E798D95E76314</hash>
<string><![CDATA[Return to the Ease of Access home
pages]]></string><wordcount>8</wordcount></node><node>
<hash>0x2578B769AA3255FDACA788AA035A78D35CB78769</hash>
<string><![CDATA[The first script works against a single local or remote
machine.]]></string><wordcount>11</wordcount></node></xmlroot>'
```

(b) The Linear-Split SELECT Stored Procedure Creation

Figure 4:
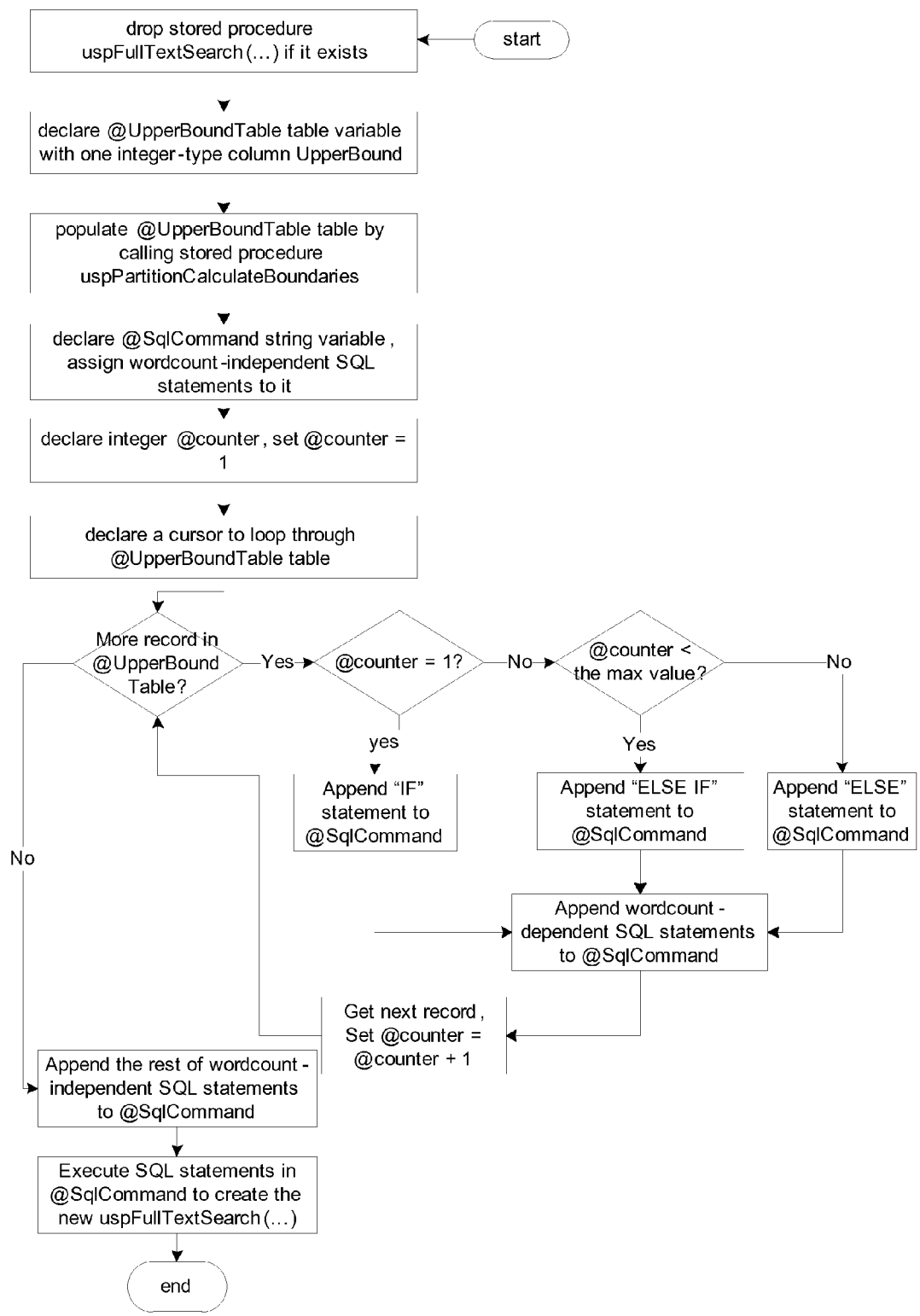
FIG. 4 is the logic flow of modifying existing SELECT stored procedure with full-text search query to use partitioned tables in accordance with one or more embodiments.

In one or more embodiments, the advantage of the partitioned tables is used to perform full-text query, based on word count of the input string data. As the number of partitioned tables could be fairly sizable, an automated stored procedure creation is utilized. The main logic for the stored procedure creation is as follows and as described FIG. 4:

(1) Declare a variable for SQL statements (2) Initialize the variable with stored procedure declaration statement, keep appending static statements (3) Append word count related SQL statements using a cursor, to loop through all partitioned tables created from previous steps (4) Append stored procedure closing statements (5) Execute the long SQL statement to create the new stored procedure that uses partitioned tables Consider also the pseudo-code Linear-Split Functionality, positioned at the end of the description but before claims, that constitutes but one way in which the linear-split functionality can be implemented.

The generated stored procedure is as provided in the file 'Generated Stored Procedure' contained within the incorporated Computer Program Listing Appendix on Compact Disc (Note: The original stored procedure "uspFullTextSearch" is now replaced by this stored procedure. They have the same name, but the newer one does full-text queries with the partitioned tables, whereas the older one uses the one big un-partitioned table).

This stored procedure is referred to as "linear-split" because the partitioned table selection is based on sequential or linear search starting from the smallest word count. Basic logic comparisons (if @WordCount<=nn) take little time, compared with the full-text queries, so the overhead is negligible.

(c) The Binary-Split SELECT Stored Procedure Creation

To compare the effectiveness for range splitting, a binary range splitting stored procedure is utilized and works like a binary search tree, e.g., it splits the range by half in each step. The basic skeleton of the stored procedure generating code is similar to the previous section, the only difference is the word count dependent logic. To facilitate the binary splitting, we create a recursive stored procedure usp_BinarySplit( . . . ) that takes a table variable as one of the input parameters. Here is the definition for the table variable:

```
CREATE TYPE [dbo].[BoundaryTableType] AS TABLE(
    [Counter] [int] IDENTITY(1,1) NOT NULL,
    [UpperBound] [int] NOT NULL
)
```

Figure 5:
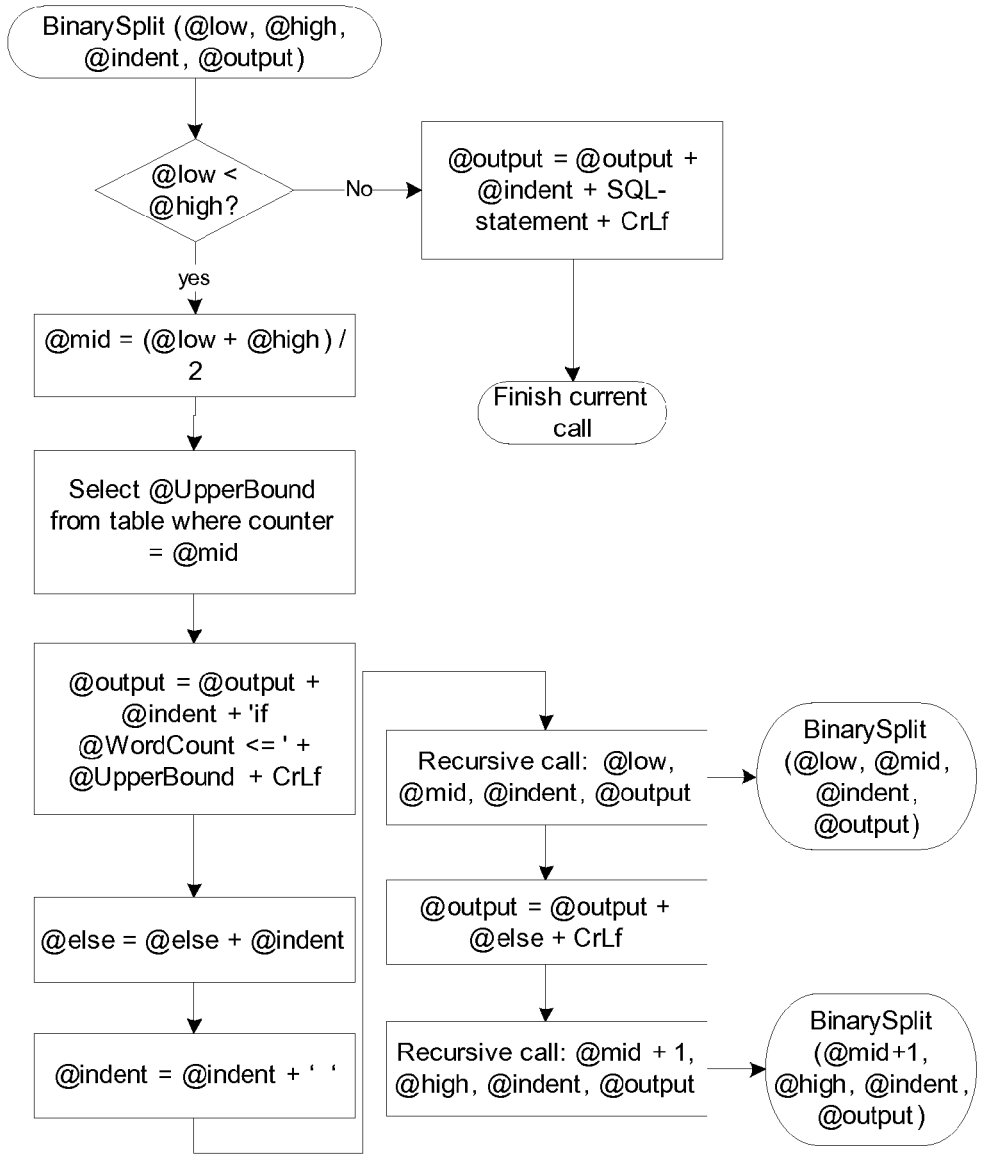
FIG. 5 is the logic flow for binary range split in accordance with one or more embodiments.

The following is the code for the recursive stored procedure that print out the wordcount-dependent SQL statement, in a binary search approach, with the appropriate indentation. Reference is also made to FIG. 5 for a description of the logic flow of the binary split:

```
CREATE PROCEDURE [dbo].[uspPartitionBinarySplit]
(
    @Low INT,
    @High INT,
    @Indent VARCHAR(1000),
    @BoundaryTable BoundaryTableType READONLY,
    @OUTPUT VARCHAR(max) OUTPUT
)
AS
BEGIN
    SET NOCOUNT ON
    IF @Low < @High
    BEGIN
        DECLARE @Mid INT, @MidPlusOne INT,
@Else VARCHAR(1000), @UpperBound INT
        -- split the range, calculate the new ending/starting ranges
        SELECT @Mid = (@Low + @High) / 2, @MidPlusOne = @mid + 1
        -- get the upper bound value from the table
        SET @UpperBound = (SELECT UpperBound FROM @BoundaryTable
WHERE [Counter]= @Mid)
        -- update the output variable with IF condition statement
        SET @OUTPUT = @OUTPUT + @Indent +
'IF @WordCount <= ' + CONVERT(VARCHAR, @UpperBound) +
CHAR(13) + CHAR(10);
        -- update the ELSE statement and indent value
        SELECT @Else = @Indent + 'ELSE', @Indent = @Indent + ' '
        -- recursive call for the left half range
        EXEC [dbo].[uspPartitionBinarySplit] @Low, @Mid, @Indent,
@BoundaryTable, @OUTPUT OUTPUT
        -- update the output variable with the ELSE condition statement
        SET @OUTPUT = @OUTPUT + @Else + CHAR(13) +
CHAR(10);
        -- recursive call for the right half range
        EXEC [dbo].[uspPartitionBinarySplit] @MidPlusOne, @High,
@Indent, @BoundaryTable, @OUTPUT OUTPUT
    END
    ELSE
    BEGIN
        -- update the output variable with the dynamic table name
        SET @OUTPUT = @OUTPUT + @Indent + 'INSERT INTO
@FuzzyMatchTable([Rank], SourceString, HashCode, MatchedString,
MatchedStringHash)' + CHAR(13) + CHAR(10)
            + @Indent + 'SELECT f.[Rank], @SourceString,
@HashCode, d.String, d.StringHash' + CHAR(13) + CHAR(10)
            + @Indent + 'FROM FREETEXTTABLE
([StringData_en-us-' + REPLACE(STR(@High,3), ' ', '0') + '],
String, @SourceString, @Top) f' + CHAR(13) + CHAR(10)
            + @Indent + '    INNER JOIN [StringData_en-us] d ON
f.[Key] = d.StringDataId' + CHAR(13) + CHAR(10)
            + @Indent + 'WHERE f.[rank] > @Threshold' +
CHAR(13) + CHAR(10)
    END
END
```

This uspPartitionBinarySplit( . . . ) stored procedure does not create the entire final full-text search stored procedure uspFullTextSearch( . . . ). Rather it creates the word count dependent part of it. Another stored procedure is used to call uspPartitionBinarySplit( . . . ) and generate the entire stored procedure uspFullTextSearch( . . . ). An example of the stored procedure uspPartitionFullTextSearchBinarySplit( . . . ) is as given as Stored Procedure uspPartitionFullTextSearchBinarySplit( . . . ), positioned at the end of the description but before teh claims.

The generated procedure uspFullTextSearch( . . . ) is provided in the file 'Generated Procedure uspFullTextSearch( . . . )' contained within the incorporated Computer Program Listing Appendix on Compact Disc.

Testing results show that the binary-split version stored procedure uspFullTextSearch( . . . ) gets the same results with the linear splitting version, and there is no performance difference.

(d) Binary-Split for Stored Procedures with Long SQL Statements

Figure 6:
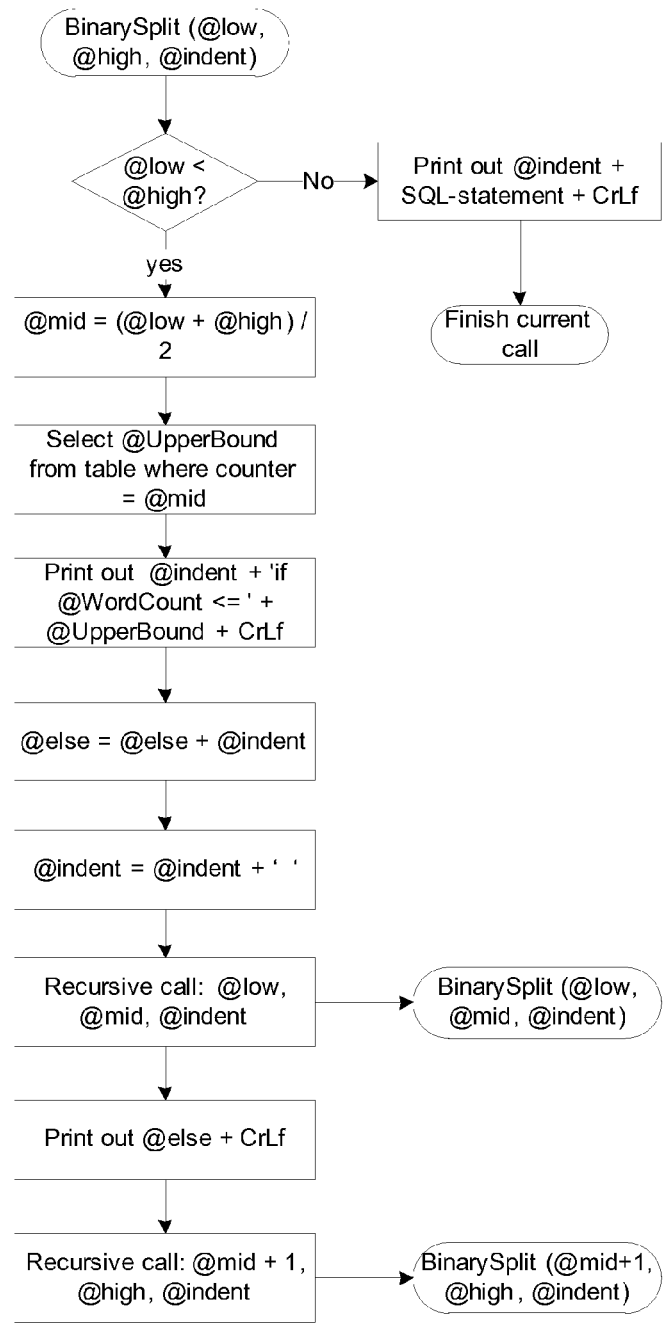
FIG. 6 is the logic flow of binary range split for long SQL statements in accordance with one or more embodiments.

It can be problematic if the dynamic SQL string generated by stored procedure uspPartitionBinarySplit( . . . ) is too long (e.g., exceeding 8,000 characters), due to SQL server database engine limitation. One workaround is to print out all the SQL statements during the recursive calls, see below uspPartitionBinarySplitForLongSqlStatement( . . . ). See also FIG. 6 for the logic flow of the binary split for long SQL statements:

```
CREATE PROCEDURE
[dbo].[uspPartitionBinarySplitForLongSqlStatement]
(
    @Low INT,
    @High INT,
    @Indent VARCHAR(1000),
    @BoundaryTable BoundaryTableType READONLY
)
AS
BEGIN
    SET NOCOUNT ON
    IF @Low < @High
    BEGIN
        DECLARE @Mid INT, @MidPlusOne INT, @Else
VARCHAR(1000), @UpperBound INT
        -- split the range, calculate the new ending / starting
ranges
        SELECT @Mid = (@Low + @High) / 2, @MidPlusOne =
@mid + 1
        -- get the upper bound value from the table
        SET @UpperBound = (SELECT UpperBound FROM
@BoundaryTable
WHERE [Counter]= @Mid)
        -- print out the IF condition statement
        PRINT @Indent + 'IF @WordCount <= ' +
CONVERT(VARCHAR, @UpperBound) + CHAR(13) + CHAR(10);
        -- update the ELSE statement and indent value
        SELECT @Else = @Indent + 'ELSE', @Indent = @Indent + ' '
        -- recursive call for the left half range
        EXEC [dbo].[uspPartitionBinarySplitForLongSqlStatement]
@Low, @Mid, @Indent, @BoundaryTable
        -- print out the ELSE condition statement
        PRINT @Else + CHAR(13) + CHAR(10);
        -- recursive call for the right half range
        EXEC [dbo].[uspPartitionBinarySplitForLongSqlStatement]
@MidPlusOne, @High, @Indent, @BoundaryTable
    END
    ELSE
    BEGIN
        -- print out the SQL statement with the dynamic table name
        PRINT @Indent + 'INSERT INTO @FuzzyMatchTable([Rank],
SourceString, HashCode, MatchedString, MatchedStringHash)' +
CHAR(13) + CHAR(10)
            + @Indent + 'SELECT f.[Rank], @SourceString,
@HashCode, d.String, d.StringHash' + CHAR(13) + CHAR(10)
            + @Indent + 'FROM FREETEXTTABLE
```

-continued

```
([StringData_en-us-' + REPLACE(STR(@High,3), ' ', '0') + '],
String, @SourceString, @Top) f' + CHAR(13) + CHAR(10)
            + @Indent + ' INNER JOIN [StringData_en-us] d ON
f.[Key] = d.StringDataId' + CHAR(13) + CHAR(10)
            + @Indent + 'WHERE f.[rank] > @Threshold' +
CHAR(13) + CHAR(10)
    END
END
```

The following is an example of how this procedure is called in the stored procedure generating code:

```
SET NOCOUNT ON
DECLARE @BoundaryTable BoundaryTableType
INSERT INTO @BoundaryTable(UpperBound)
EXEC [uspPartitionCalculateBoundaries] 30
DECLARE @High INT = (SELECT COUNT(*) FROM
@BoundaryTable)
EXEC [dbo].[ uspPartitionBinarySplitForLongSqlStatement] 1,
@High, '      ', @BoundaryTable
```

This code is manually copied from the SQL Server output window, and used to replace the wordcount-dependant code from the linear-split stored procedure uspFullTextSearch( . . . ), to create the binary-split version.

Modify Stored Procedure for
INSERT/DELETE/UPDATE

As always, there are also tasks to INSERT/UPDATE/DELETE records in the table. These tasks can become even more challenging because there may be many partitioned tables with overlapping boundaries. As an example, consider a partition with 22 tables:

| Table Number | Lower Bound | Upper Bound | Full-text Search Word Range |
|---|---|---|---|
| 1 | 1 | 4 | 1-3 |
| 2 | 2 | 7 | 4-5 |
| 3 | 4 | 9 | 6-7 |
| 4 | 6 | 11 | 8-9 |
| 5 | 7 | 14 | 10-11 |
| 6 | 9 | 16 | 12-13 |
| 7 | 11 | 18 | 14-15 |
| 8 | 13 | 22 | 16-18 |
| 9 | 15 | 25 | 19-21 |
| 10 | 18 | 29 | 22-24 |
| 11 | 20 | 33 | 25-28 |
| 12 | 24 | 39 | 29-33 |
| 13 | 28 | 46 | 34-39 |
| 14 | 33 | 55 | 40-47 |
| 15 | 40 | 67 | 48-57 |
| 16 | 48 | 84 | 58-72 |
| 17 | 61 | 108 | 73-93 |
| 18 | 79 | 142 | 94-123 |
| 19 | 104 | 190 | 124-164 |
| 20 | 139 | 270 | 165-234 |
| 21 | 199 | 398 | 235-345 |
| 22 | 293 | 1221 | 346-1061 |

This data can be organized differently—in a 2-dimensional table, as shown in FIG. 7. There, the horizontal dimension (top row) is the word count, and the vertical dimension (left column) is the table name count. The numbers in the main area of the table are the word counts covered in each table, (the bold numbers are the actual searched word count range, normal fonts are margins for fuzziness).

Figure 8:
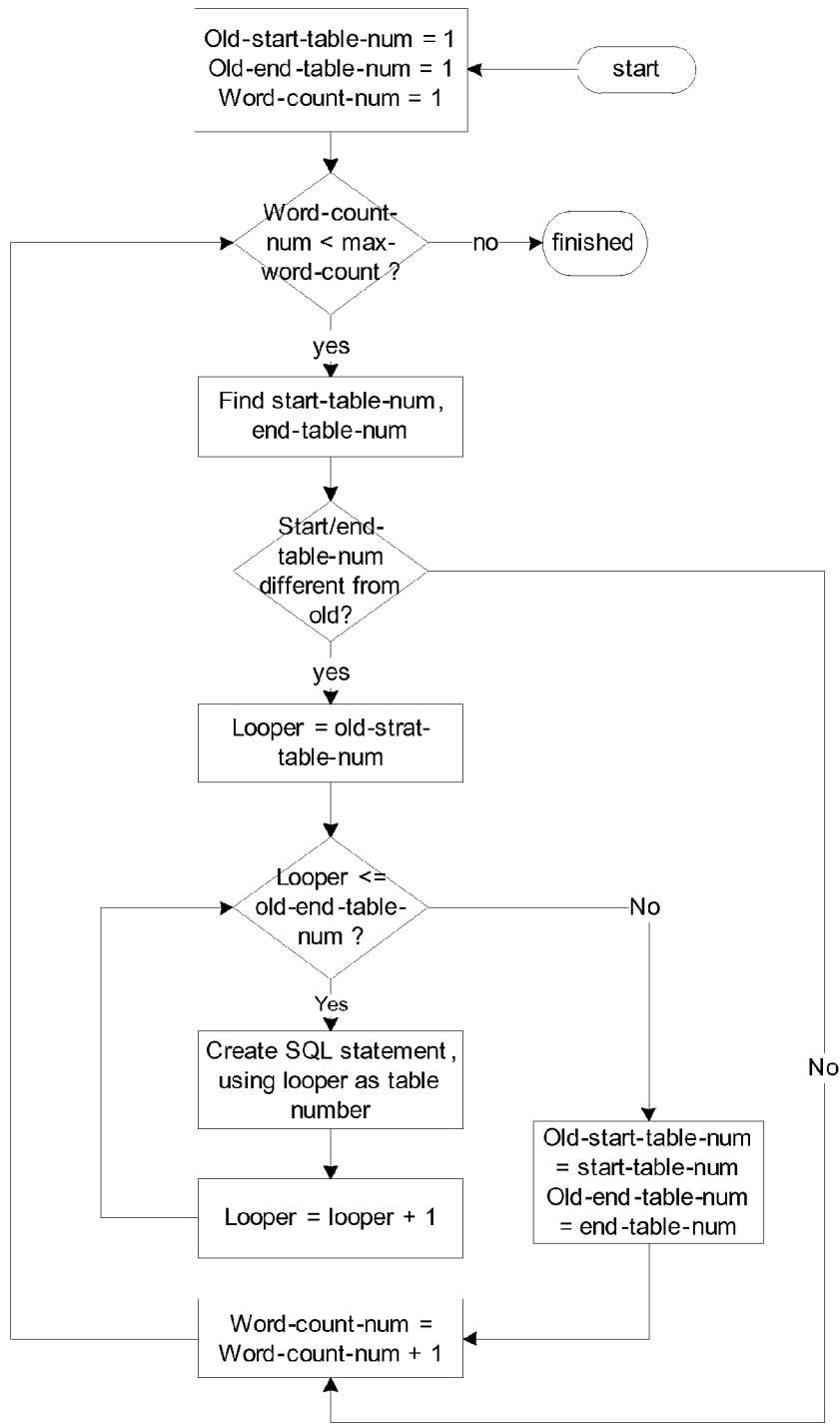
FIG. 8 is the logic flow for INSERT/DELETE/UPDATE SQL script generating in accordance with one or more embodiments.

Now let's find out which table(s) should a particular word count belong to, by picking a word count from the top row and then looking down to the main area, and then locating all table counts on the left column. For example, for word count of 11, we can find out it belongs tables 4, 5, 6, and 7. Furthermore, when we do not move to the next word count, if the starting table count nor the ending table count changes, these two words counts belong to the same set of tables. Here is an example algorithm for accomplishing this task. Reference is also made to FIG. 8 for the logic flow for INSERT/UPDATE/DELETE script generating):

(1) Set old-start-table-num=1 and old-end-table-num=1
(2) Starting word count=1
(3) Find the start-table-num and end-table-num
(4) If either start-table-num !=old-start-table-num or end-table-num !=old-end-table-num
(5) Create SQL statements for tables between old-start-table-num and old-end-table-num
(6) Old-start-table=start-table-num, old-end-table-num=end-table-num
(7) Else
(8) Find the next word count, repeat step (2) to (8)

As an example of script generating code, consider the Example Script Generating Code, positioned at the end of the description but before the claims.

For simplicity, the generated stored procedure uspImportString( . . . ) is not listed here. Modifications for DELETE and UPDATE statements are not included either, although each logically follows a similar path to that described just above.

Figure 9:
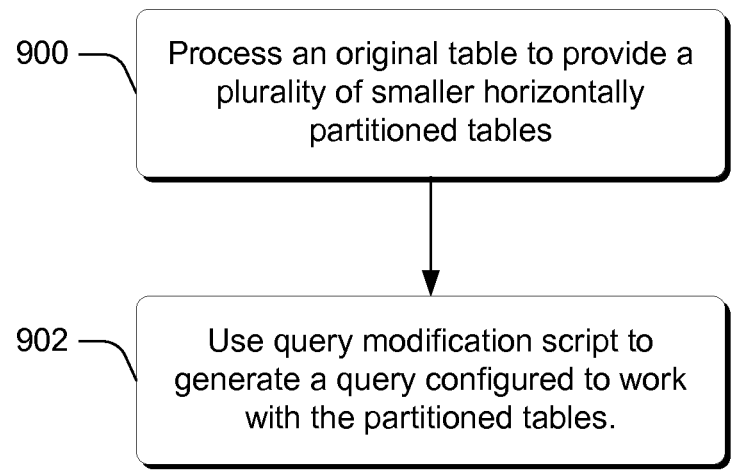
FIG. 9 is an illustration of high-level upgrading process to use database table/index partitioning in accordance with one or more embodiments.

FIG. 9 is a flow diagram that describes steps in a method in accordance with one or more embodiments. The method can be implemented in connection with any suitable hardware, software, firmware, or combination thereof. In at least some embodiments, aspects of the method can be implemented by system such as that described in FIG. 1.

Step 900 processes an original table to provide a plurality of smaller horizontally partitioned tables. In the illustrated and described embodiments, the partitioned tables are configured to allow at least some overlapping data records as described above. Examples of how an original table can be processed to provide the partitioned tables are provided above. Step 900 to uses query modification script to generate a query configured to work with the partitioned tables. Various examples of how this can be done are provided above.

Having described example methods in accordance with one or more embodiments, consider now an example device that can be utilized to implement the embodiments described above.

Example Device

Figure 10:
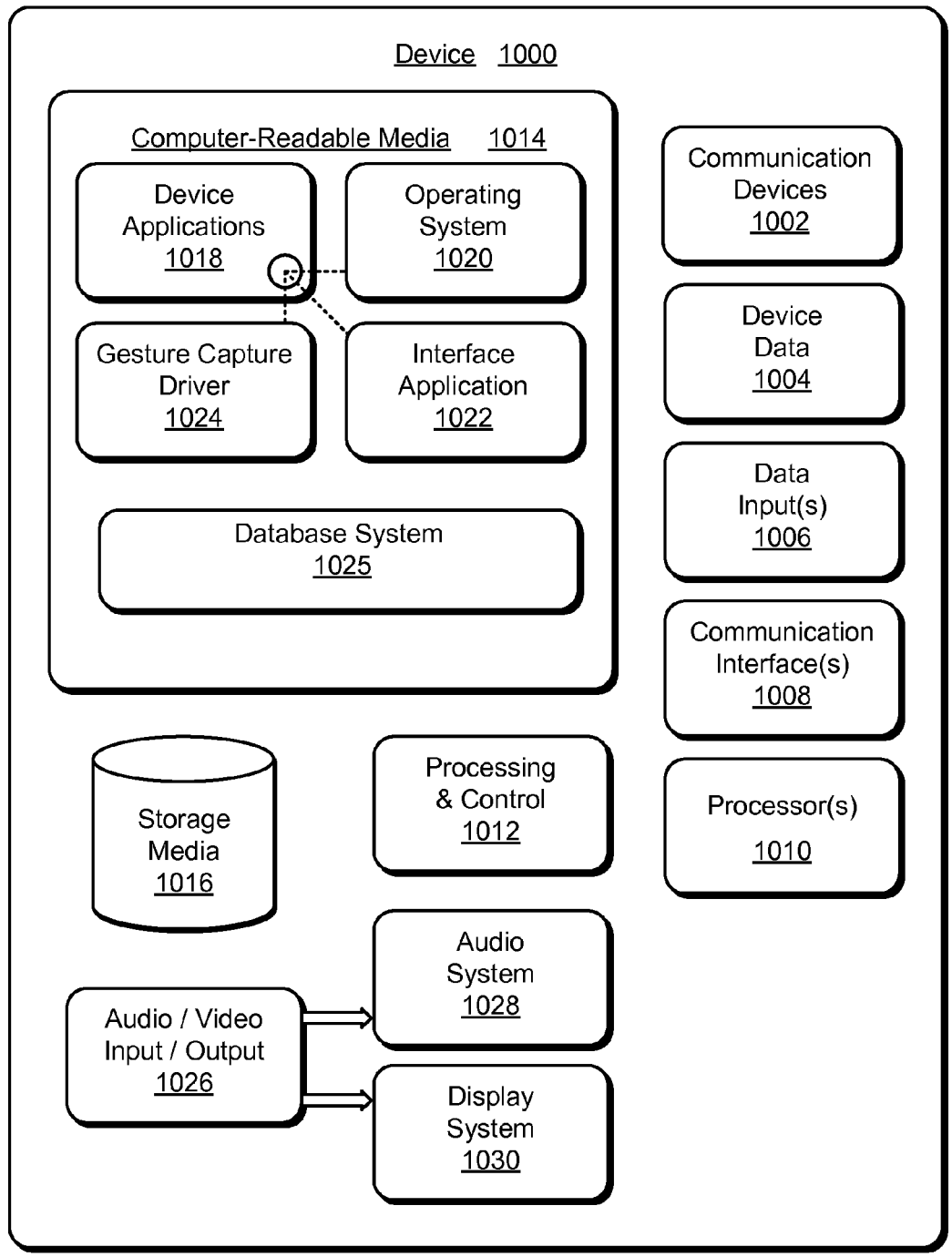
FIG. 10 illustrates an example computing device that can be utilized to implement various embodiments described herein.

FIG. 10 illustrates various components of an example device 1000 that can be implemented as any type of portable and/or computer device as described with reference to FIG. 1. Device 1000 includes communication devices 1002 that enable wired and/or wireless communication of device data 1004 (e.g., received data, data that is being received, data scheduled for broadcast, data packets of the data, etc.). The device data 1004 or other device content can include configuration settings of the device, media content stored on the device, and/or information associated with a user of the device. Media content stored on device 1000 can include any type of audio, video, and/or image data. Device 1000 includes one or more data inputs 1006 via which any type of data, media content, and/or inputs can be received, such as user-selectable inputs, messages, music, television media content, recorded video content, and any other type of audio, video, and/or image data received from any content and/or data source.

Device 1000 also includes communication interfaces 1008 that can be implemented as any one or more of a serial and/or parallel interface, a wireless interface, any type of network interface, a modem, and as any other type of communication interface. The communication interfaces 1008 provide a connection and/or communication links between device 1000 and a communication network by which other electronic, computing, and communication devices communicate data with device 1000.

Device 1000 includes one or more processors 1010 (e.g., any of microprocessors, controllers, and the like) which process various computer-executable or readable instructions to control the operation of device 1000 and to implement the embodiments described above. Alternatively or in addition, device 1000 can be implemented with any one or combination of hardware, firmware, or fixed logic circuitry that is implemented in connection with processing and control circuits which are generally identified at 1012. Although not shown, device 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1000 also includes computer-readable media 1014, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1000 can also include a mass storage media device 1016.

Computer-readable media 1014 provides data storage mechanisms to store the device data 1004, as well as various device applications 1018 and any other types of information and/or data related to operational aspects of device 1000. For example, an operating system 1020 can be maintained as a computer application with the computer-readable media 1014 and executed on processors 1010. The device applications 1018 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 1018 also include any system components or modules to implement embodiments of the techniques described herein. In this example, the device applications 1018 include an interface application 1022 and a gesture-capture driver 1024 that are shown as software modules and/or computer applications. The gesture-capture driver 1024 is representative of software that is used to provide an interface with a device configured to capture a gesture, such as a touchscreen, track pad, camera, and so on. Alternatively or in addition, the interface application 1022 and the gesture-capture driver 1024 can be implemented as hardware, software, firmware, or any combination thereof. In addition, computer readable media 1014 can include a database system 1025 that functions as described above.

Device 1000 also includes an audio and/or video input-output system 1026 that provides audio data to an audio system 1028 and/or provides video data to a display system 1030. The audio system 1028 and/or the display system 1030 can include any devices that process, display, and/or otherwise render audio, video, and image data. Video signals and audio signals can be communicated from device 1000 to an audio device and/or to a display device via an RF (radio frequency) link, S-video link, composite video link, component video link, DVI (digital video interface), analog audio connection, or other similar communication link. In an embodiment, the audio system 1028 and/or the display system 1030 are implemented as external components to device 1000. Alternatively, the audio system 1028 and/or the display system 1030 are implemented as integrated components of example device 1000.

Conclusion

The embodiments described above permit automated table partitioning that allows for overlapping. The techniques are especially useful for full-text queries, but can be utilized in general table partition as well. Using the described techniques, execution time can be reduced, with additional benefits from applying different settings on partitioned tables. The included scripts cover table partition logic based on population, partitioned table/index creation, modified SELECT procedure with linear range split and binary range split, and modified store procedures for INSERT statements.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

Computer Code

Word Count Boundary Logic:

```
CREATE PROCEDURE [dbo].[uspPartitionCalculateBoundaries]
        @NumberOfBoundarys INT, -- the desired total number of tables
        @FullRate FLOAT = 0.75 -- the threshold of full rate to start a new table (the default value)
AS
BEGIN
        SET NOCOUNT ON;
        DECLARE @GrandTotal BIGINT = (SELECT SUM(WordCount) FROM [StringData en-us])
        DECLARE @AverageCount BIGINT = @GrandTotal / @NumberOfBoundarys
        DECLARE @RunningTotal BIGINT = 0, @SubTotal BIGINT = 0, @WordCount INT
        DECLARE CreateBoundaryCursor CURSOR FOR
        SELECT WordCount, WordCount * COUNT(*) AS SubTotal
        FROM [StringData en-us]
        GROUP by WordCount
        ORDER by WordCount
        OPEN CreateBoundaryCursor
        FETCH NEXT FROM CreateBoundaryCursor
        INTO @WordCount, @SubTotal
        -- to store the suggested upper bound word count for partitioned tables
        DECLARE @UpperBoundTable TABLE
        (
                UpperBound INT
        )
        WHILE @@FETCH STATUS = 0
        BEGIN
            IF @SubTotal > 0
            BEGIN
                IF @SubTotal > @FullRate * @AverageCount
                BEGIN
                        -- if the sub total is 0.75 full (for example), then start a new table
                        IF (@RunningTotal) > @FullRate * @AverageCount
                        BEGIN
                                -- the running total alone is large enough to start a new table
                                INSERT INTO @UpperBoundTable(UpperBound) VALUES(@WordCount – 1)
                                END
                                -- start a new table
                                INSERT INTO @UpperBoundTable(UpperBound) VALUES(@WordCount)
                                SET @RunningTotal = 0
                        END
                        ELSE IF (@RunningTotal + @SubTotal) > @FullRate * @AverageCount
                        BEGIN
                                -- the running-total plus sub-total is large enough, start a new table
                                INSERT INTO @UpperBoundTable(UpperBound) VALUES(@WordCount)
                                SET @RunningTotal = 0
                        END
                        ELSE
                        BEGIN
                                -- otherwise keep accumulating
```

```
                SET @RunningTotal = @RunningTotal + @SubTotal
            END
        END
        FETCH NEXT FROM CreateBoundaryCursor
            INTO @WordCount, @SubTotal
    END
    CLOSE CreateBoundaryCursor
    DEALLOCATE CreateBoundaryCursor
    -- add the last partitioned table
    INSERT INTO @UpperBoundTable(UpperBound) VALUES(@WordCount)
    -- return the results
    SELECT UpperBound FROM @UpperBoundTable ORDER BY 1
END
```

```
CREATE PROCEDURE [dbo].[uspPartitionCreateTables]
    @NumberOfPartitions INT,        -- the desired total number of partitions
    @FullRate FLOAT = 0.75,         -- the threshold of fill factor to start a new table
    @MarginRate FLOAT = 0.15,       -- the percentage of overlapping outside each table
    @MarginPadding FLOAT = 1.5      -- the absolute value added as overlapping word count
AS
BEGIN
    SET NOCOUNT ON;
    -- (1) delete existing partitioned tables, if any
    DECLARE @TableName varchar(50)
    DECLARE DeleteCursor CURSOR FOR
    SELECT Name FROM sys.objects WHERE TYPE = 'U' AND NAME LIKE 'StringData en-us-%'
    OPEN DeleteCursor
    FETCH NEXT FROM DeleteCursor
        INTO @TableName
    WHILE @@FETCH STATUS = 0
    BEGIN
        DECLARE @DeleteCmd VARCHAR(MAX) = 'DROP TABLE [' + @TableName + ']'
        EXEC(@DeleteCmd)
        FETCH NEXT FROM DeleteCursor
            INTO @TableName
    END
    CLOSE DeleteCursor
    DEALLOCATE DeleteCursor
    -- (2) declare and populate table variable for suggested upper bound word counts
    DECLARE @UpperBoundTable TABLE
    (
        UpperBound INT
    )
    -- call the stored procedure to create partition upperbounds
    INSERT INTO @UpperBoundTable(UpperBound)
    EXEC [uspPartitionCalculateBoundaries] @NumberOfPartitions, @FullRate
    -- (3) create the partitioned table
    DECLARE @UpperBound INT, @Counter INT, @TableNumber NVARCHAR(3), @LowBound INT,
        @HighBound INT, @PrevUpperBound INT, @UpperMargin INT, @LowMargin INT,
        @SqlCommand NVARCHAR(MAX)
    SET @Counter = 1
    SET @LowBound = 1
    SET @PrevUpperBound = 1
    DECLARE CreateCursor CURSOR FOR
    SELECT UpperBound INT
    FROM @UpperBoundTable
    OPEN CreateCursor
    FETCH NEXT FROM CreateCursor
    INTO @UpperBound
    WHILE @@FETCH STATUS = 0
    BEGIN
        -- margin is proportional to upper bound, plus an absolute padding
        SET @UpperMargin = @MarginRate * @UpperBound + @MarginPadding
        SET @HighBound = @UpperBound + @UpperMargin
        -- set the low and high bounds
        SET @LowMargin = @MarginRate * @PrevUpperBound + @MarginPadding
```

```
                IF @PrevUpperBound > @LowMargin
                BEGIN
                        SET @LowBound = @PrevUpperBound - @LowMargin
                END
                -- table number suffix, for example 003
                SET @TableNumber = REPLACE(STR(@Counter,3) ,' ','0')
                -- build create table and index SQL command
                SET @SqlCommand = '
                CREATE TABLE [dbo].[StringData en-us-' + @tablenumber + '](
                        [StringDataId] [bigint] NOT NULL,
                        [String] [nvarchar](max) NOT NULL,
                        [StringHash] [binary](20) NOT NULL,
                        [WordCount] [int] NULL,
                        CONSTRAINT [PK StringData en-us-' + @tablenumber + '] PRIMARY
KEY CLUSTERED
                        (
                                [StringDataId] ASC
                        )WITH (PAD INDEX = OFF, STATISTICS NORECOMPUTE = OFF,
IGNORE DUP KEY = OFF, ALLOW ROW LOCKS = ON, ALLOW PAGE LOCKS = ON) ON
[PRIMARY]
                ) ON [PRIMARY]
                CREATE UNIQUE NONCLUSTERED INDEX [IX StringData en-us-' +
@tablenumber + ' StringHash] ON [dbo].[StringData en-us-' +
@tablenumber + ']
                (
                        [StringHash]ASC
                )WITH (PAD INDEX = OFF, STATISTICS NORECOMPUTE = OFF,
SORT IN TEMPDB = OFF, IGNORE DUP KEY = OFF, DROP EXISTING = OFF, ONLINE
= OFF, ALLOW ROW LOCKS = ON, ALLOW PAGE LOCKS = ON) ON [PRIMARY]
                CREATE FULLTEXT INDEX ON [StringData en-us-' + @tablenumber +
'] (String)
                        KEY INDEX [PK StringData en-us-' + @tablenumber + ']
                        WITH STOPLIST = OFF;
                '
                -- create the partitioned table
                EXEC(@SqlCommand)
                SET @SqlCommand = '
                INSERT INTO [StringData en-us-' + @tablenumber +
'] ([StringDataId], [String], [StringHash], [WordCount])
                        SELECT e.[StringDataId], e.[String], e.[StringHash],
e.[WordCount]
                        FROM [StringData en-us] e LEFT JOIN [StringData en-us-' +
@tablenumber + '] u ON e.StringDataId = u.StringDataId
                        WHERE u.StringDataId IS NULL AND e.[WordCount] BETWEEN ' +
CONVERT(VARCHAR, @LowBound) + ' AND ' + CONVERT(VARCHAR, @HighBound)
                -- populate the partitioned table
                EXEC(@SqlCommand)
                SET @PrevUpperBound = @UpperBound + 1
                FETCH NEXT FROM CreateCursor
                INTO @UpperBound
                SET @Counter = @Counter + 1
        END
        CLOSE CreateCursor
        DEALLOCATE CreateCursor
END
```

```
CREATE PROCEDURE [dbo].[uspFullTextSearch]
        @InputXml xml,
        @Top INT = 15,
        @Threshold INT = 100
AS
BEGIN
        SET NOCOUNT ON;
        -- Create a table variable to store the search SourceString
        DECLARE @SourceStringTable TABLE
                HashCode BINARY(20),
                SourceString VARCHAR(MAX)
        )
        -- Parse XML input to get hash code and source string, then
insert into the temporary Source String table
        INSERT INTO @SourceStringTable(HashCode, SourceString)
        SELECT CONVERT(varbinary(20),
XmlNodeTable.XmlNode.value('hash[1]', 'VARCHAR(50) ')),
                XmlNodeTable.XmlNode.value('string[1]', 'VARCHAR(4000)')
        FROM @InputXml.nodes('//xmlroot/node') AS XmlNodeTable(XmlNode)
```

```
                -- declare a table variable to store the full-text search results
                DECLARE @FuzzyMatchTable TABLE
                (
                        [Rank] int,
                        SourceString NVARCHAR(4000),
                        HashCode BINARY(20),
                        MatchedString NVARCHAR(4000),
                        MatchedStringHash BINARY(20)
                )
                DECLARE @SourceString NVARCHAR(4000), @HashCode BINARY(20)
                -- declare a cursor for the input data set
                DECLARE InputCursor CURSOR FOR
                SELECT s.SourceString, s.HashCode
                FROM @SourceStringTable s
                -- WHERE clause can be used to limit the input data set
                -- open the cursor and get the first set of input data
                OPEN InputCursor
                FETCH NEXT FROM InputCursor
                INTO @SourceString, @HashCode
                -- loop through the input data set
                WHILE @@FETCH STATUS = 0
                BEGIN
                        -- insert the result set into the table variable
                        INSERT INTO @FuzzyMatchTable([Rank], SourceString,
HashCode,
                                MatchedString, MatchedStringHash)
                        SELECT f.[Rank], @SourceString, @HashCode, d.String,
d.StringHash
                        -- use full-text search on the original table
[StringData en-us]
                        FROM FREETEXTTABLE ([StringData en-us], String,
@SourceString, @Top) f
                        -- Join the result set with the original table to get the
candidate strings
                        INNER JOIN [StringData en-us] d ON f.[Key] = d.StringDataId
                        WHERE f.[rank] > @Threshold
                        FETCH NEXT FROM InputCursor
                        INTO @SourceString, @HashCode
                END
                CLOSE InputCursor
                DEALLOCATE InputCursor
                -- Select all records from the table variable, additional joins
can be used here
                SELECT * FROM @FuzzyMatchTable
END
```

```
CREATE PROCEDURE [dbo].[uspPartitionFullTextSearch-LinearSplit]
        @NumberOfPartitionedTables INT,                 -- the desired total
number of partitioned tables, the calculated result might be different
        @FullRate FLOAT = 0.75          -- the threshold of fill factor to
start a new partitioned table
AS
BEGIN
        SET NOCOUNT ON;
        -- delete existing partitioned tabls, if any
        DECLARE @SqlCommand NVARCHAR(MAX) = '
        IF EXISTS (SELECT * FROM sys.objects WHERE object id =
OBJECT ID(N' ' [dbo].[uspFullTextSearch]' ') AND type in (N' 'P' ',
N' 'PC' '))
        DROP PROCEDURE [dbo].[uspFullTextSearch]'
        EXEC (@SqlCommand)
        -- to store the suggested upper bound word count for partitioned
tables
        DECLARE @UpperBoundTable TABLE
        (
                UpperBound INT
        )
        -- call the stored procedure to create partitioned table
upperbounds
        INSERT INTO @UpperBoundTable (UpperBound)
        EXEC [uspPartitionCalculateBoundaries]
@NumberOfPartitionedTables, @FullRate
        -- Then create new stored procedure.
        SET @SqlCommand = '
```

```
CREATE PROCEDURE [dbo].[uspFullTextSearch]
        @InputXml xml,
        @Top INT = 15,
        @Threshold INT = 100
AS
BEGIN
        SET NOCOUNT ON;
        -- Create a table variable to store the search SourceString
        DECLARE @SourceStringTable TABLE (
                        HashCode BINARY(20),
                        SourceString VARCHAR(MAX),
                        WordCount INT
        )
        -- Parse XML input to get hash code and source string, then
insert into the temporary Source String table
        INSERT INTO @SourceStringTable (HashCode, SourceString, WordCount)
        SELECT CONVERT(varbinary(20),
XmlNodeTable.XmlNode.value(' 'hash[1]' ', ' 'VARCHAR(50) ' ')),
                XmlNodeTable.XmlNode.value(' 'string[1] ' ',
' 'VARCHAR(4000) ' '),
                XmlNodeTable.XmlNode.value(' 'wordcount[1] ' ',
' 'VARCHAR(20) ' ')
        FROM @InputXml.nodes(' '//xmlroot/node' ') AS XmlNodeTable(XmlNode)
        -- declare a table variable to store the full-text search results
        DECLARE @FuzzyMatchTable TABLE
        (
                [Rank] int,
                SourceString NVARCHAR(4000),
                HashCode BINARY(20),
                MatchedString NVARCHAR(4000),
                MatchedStringHash BINARY(20)
        )
        DECLARE @SourceString NVARCHAR(4000), @HashCode BINARY(20),
@WordCount INT
        -- declare a cursor for the input data set
        DECLARE InputCursor CURSOR FOR
        SELECT s.SourceString, s.HashCode, s.WordCount
        FROM @SourceStringTable s
        -- WHERE clause can be used to limit the input data set
        -- open the cursor and get the first set of input data
        OPEN InputCursor
        FETCH NEXT FROM InputCursor
        INTO @SourceString, @HashCode, @WordCount
        -- loop through the input data set
        WHILE @@FETCH_STATUS = 0
        BEGIN
                -- perform full-text search on the partitioned tables, and
insert the result into the table variable
'
                -- now use the cursor to create the SQL statements that depend on
word count
        DECLARE @UpperBound INT, @Counter INT, @TableNumber NVARCHAR(3),
@MaxTableCounter INT
        SET @Counter = 1
        SET @MaxTableCounter = (SELECT COUNT(*) FROM @UpperBoundTable)
    DECLARE CreateSPCursor CURSOR FOR
    SELECT UpperBound
    FROM @UpperBoundTable
    OPEN CreateSPCursor
    FETCH NEXT FROM CreateSPCursor
    INTO @UpperBound
    WHILE @@FETCH_STATUS = 0
    BEGIN
            -- table number suffix, for example 003
            SET @TableNumber = REPLACE(STR(@Counter,3) , ' ', '0')
            -- choose an approporiate "if" conidtion based on word count
                IF @Counter = 1
                        SET @SqlCommand = @SqlCommand + '            IF
@WordCount <= ' + CONVERT(varchar, @UpperBound)
                ELSE IF @Counter < @MaxTableCounter
                        SET @SqlCommand = @SqlCommand + CHAR(13) + CHAR(10) +
'
                ELSE IF @WordCount <= ' + CONVERT(varchar, @UpperBound)
                ELSE
                        SET @SqlCommand = @SqlCommand + CHAR(13) + CHAR(10) +
'
                ELSE '
                -- create the full-text search statement, with dynamic
table number suffix
                SET @SqlCommand = @SqlCommand + '
                        INSERT INTO @FuzzyMatchTable([Rank], SourceString,
HashCode, MatchedString, MatchedStringHash)
```

```
                        SELECT f.[Rank], @SourceString, @HashCode, d.String,
d.StringHash
                        FROM FREETEXTTABLE ([StringData en-us-' +
@tablenumber + '], String, @SourceString, @Top) f
                        INNER JOIN [StringData en-us] d ON f.[Key] =
d.StringDataId
                        WHERE f.[rank] > @Threshold '
            FETCH NEXT FROM CreateSPCursor
            INTO @UpperBound
            SET @Counter = @Counter + 1
      END
      CLOSE CreateSPCursor
      DEALLOCATE CreateSPCursor
            SET @SqlCommand = @SqlCommand + '
                  FETCH NEXT FROM InputCursor
                  INTO @SourceString, @HashCode, @WordCount
            END
            CLOSE InputCursor
            DEALLOCATE InputCursor
            -- Select all records from the table variable, additional joins
can be used here
            SELECT * FROM @FuzzyMatchTable
END
'
            EXEC (@SqlCommand)
END
```

```
CREATE PROCEDURE [dbo].[uspPartitionFullTextSearchBinarySplit]
      @NumberOfPartitionedTables INT,              -- the desired total
number of partitioned tables, the calculated result might be different
      @FullRate FLOAT = 0.75              -- the threshold of fill factor to
start a new partitioned table
AS
BEGIN
      SET NOCOUNT ON;
      -- delete existing partitioned tables, if any
      DECLARE @SqlCommand NVARCHAR(MAX) = '
      IF EXISTS (SELECT * FROM sys.objects WHERE object id =
OBJECT ID(N' ' [dbo].[uspFullTextSearch]' ') AND type in (N' ' P' ',
N' ' PC' '))
      DROP PROCEDURE [dbo].[uspFullTextSearch]'
      EXEC (@SqlCommand)
      -- to store the suggested upper bound word count for partitioned
tables
      DECLARE @UpperBoundTable TABLE
      (
            UpperBound INT
      )
      -- call the stored procedure to create partitioned table
upperbounds
      INSERT INTO @UpperBoundTable (UpperBound)
      EXEC [uspPartitionCalculateBoundaries]
@NumberOfPartitionedTables, @FullRate
      -- Then create new stored procedure.
      SET @SqlCommand = '
CREATE PROCEDURE [dbo].[uspFullTextSearch]
      @InputXml xml,
      @Top INT = 15,
      @Threshold INT = 100
AS
BEGIN
      SET NOCOUNT ON;
      -- Create a table variable to store the search SourceString
      DECLARE @SourceStringTable TABLE (
            HashCode BINARY(20),
            SourceString VARCHAR(MAX),
            WordCount INT
      )
      -- Parse XML input to get hash code and source string, then
insert into the temporary Source String table
      INSERT INTO @SourceStringTable(HashCode, SourceString, WordCount)
      SELECT CONVERT(varbinary(20),
```

```
                    -continued

XmlNodeTable.XmlNode.value(' 'hash[1] ' ', ' 'VARCHAR(50) ' ')),
            XmlNodeTable.XmlNode.value(' 'string[1] ' ',
' 'VARCHAR(4000) ' '),
            XmlNodeTable.XmlNode.value(' 'wordcount[1] ' ',
' 'VARCHAR(20) ' ')
        FROM @InputXml.nodes(' '//xmlroot/node' ') AS XmlNodeTable(XmlNode)
        -- declare a table variable to store the full-text search results
        DECLARE @FuzzyMatchTable TABLE
        (
            [Rank]int,
            SourceString NVARCHAR(4000),
            HashCode BINARY(20),
            MatchedString NVARCHAR(4000),
            MatchedStringHash BINARY(20)
        )
        DECLARE @SourceString NVARCHAR(4000), @HashCode BINARY(20),
@WordCount INT
        -- declare a cursor for the input data set
        DECLARE InputCursor CURSOR FOR
        SELECT s.SourceString, s.HashCode, s.WordCount
        FROM @SourceStringTable s
        -- WHERE clause can be used to limit the input data set
        -- open the cursor and get the first set of input data
        OPEN InputCursor
        FETCH NEXT FROM InputCursor
        INTO @SourceString, @HashCode, @WordCount
        -- loop through the input data set
        WHILE @@FETCH STATUS = 0
        BEGIN
                -- perform full-text search on the partitioned tables, and
insert the result into the table variable
'
        -- now use the cursor to create the SQL statements that depend on
word count
        DECLARE @BoundaryTable BoundaryTableType, @OUTPUT varchar(max) =
' '
        INSERT INTO @BoundaryTable(UpperBound)
        EXEC [uspPartitionCalculateBoundaries] @NumberOfPartitionedTables
        DECLARE @High INT = (SELECT COUNT(*) FROM @BoundaryTable)
        EXEC [dbo].[uspPartitionBinarySplit] 1, @High, '               ',
@BoundaryTable, @OUTPUT output
        SET @SqlCommand = @SqlCommand + @OUTPUT
        SET @SqlCommand = @SqlCommand + '
                FETCH NEXT FROM InputCursor
                INTO @SourceString, @HashCode, @WordCount
        END
        CLOSE InputCursor
        DEALLOCATE InputCursor
        -- Select all records from the table variable, additional joins
can be used here
        SELECT * FROM @FuzzyMatchTable
END
'
        EXEC (@SqlCommand)
END
```

```
CREATE PROCEDURE [dbo].[uspPartitionInserts]
        @NumberOfPartitionedTables INT,          -- the desired total
number of partitioned tables, the calculated result might be different
        @FullRate FLOAT = 0.75,                  -- the threshold of fill factor to
start a new partitioned table
        @MarginRate FLOAT = 0.15,                -- the percentage of overlapping
word counts outside each table
        @MarginPadding FLOAT = 1.5               -- the absolute value added as
overlapping word counts to each table
AS
BEGIN
        -- SET NOCOUNT ON added to prevent extra result sets FROM
        -- Interfering with SELECT statements.
        SET NOCOUNT ON
        IF EXISTS (SELECT * FROM sys.objects WHERE object id =
OBJECT ID(N' [dbo].[uspImportString] ') AND type in (N'P', N'PC'))
        DROP PROCEDURE [dbo].[uspImportString]
        DECLARE @createSPCmd NVARCHAR(MAX) = '
CREATE PROCEDURE [dbo].[uspImportString]
```

```
                @String nvarchar(max),
                @StringHash binary(20),
                @WordCount int
AS
BEGIN
        SET NOCOUNT ON
        DECLARE @StringDataId bigint
        INSERT INTO [StringData en-us] (String, StringHash, WordCount)
        VALUES(@String, @StringHash, @WordCount)
        SET @StringDataId = SCOPE_IDENTITY( )
,
        -- to store the suggested upper bound word count for partitioned
tables
        DECLARE @UpperBoundTable TABLE
        (
                UpperBound INT
        )
        -- call the stored procedure to create partitioned table
upperbounds
        INSERT INTO @UpperBoundTable(UpperBound)
        EXEC [uspPartitionTables CalculatePartitions]
@NumberOfPartitions, @FullRate
        -- A table to store the the actual lower and upper bounds for
word count.
        DECLARE @NumberTable TABLE
        (
                TableCounter INT,
                LowerNumber INT,
                UpperNumber INT
        )
        DECLARE @UpperBound INT, @Counter INT, @TableNumber NVARCHAR(3),
@LowBound INT, @HighBound INT, @PrevUpperBound INT,
                @UpperMargin INT, @LowMargin INT, @SqlCommand
NVARCHAR(MAX), @LowerNumber INT, @UpperNumber INT
        SET @Counter = 1
        SET @LowBound = 1
        SET @PrevUpperBound = 1
        SET @LowerNumber = 1
        -- It uses the results from our auto table splitting logic,
        -- but it can use results from any process (for example, manual
popuplating).
    DECLARE TableNumCursor CURSOR FOR
    SELECT UpperBound INT
    FROM @UpperBoundTable
    OPEN TableNumCursor
    FETCH NEXT FROM TableNumCursor
    INTO @UpperBound
    WHILE @@FETCH_STATUS = 0
    BEGIN
            -- prepare upper number
            SET @UpperMargin = @MarginRate * @UpperBound + @MarginPadding
            SET @UpperNumber = @UpperBound + @UpperMargin
            -- prepare lower number
            SET @LowMargin = @MarginRate * @PrevUpperBound + @MarginPadding
            IF @PrevUpperBound > @LowMargin
            BEGIN
                        SET @LowerNumber = @PrevUpperBound - @LowMargin
                    END
            -- prepare table name suffix
            SET @TableNumber = replace(str(@Counter,3) ,' ', '0')
                    -- actually populate the @NumberTable table
                    INSERT INTO @NumberTable([TableCounter], [LowerNumber],
[UpperNumber])
                    VALUES(@Counter, @LowerNumber, @UpperNumber)
            -- update looping variables
            SET @PrevUpperBound = @UpperBound + 1
            SET @Counter = @Counter + 1
            FETCH NEXT FROM TableNumCursor
            INTO @UpperBound
    END
    CLOSE TableNumCursor
    DEALLOCATE TableNumCursor
        -- following logic is based on our unique algorithm to generate
minimum conditional switch and SQL insert/update/delete statements
```

```
    DECLARE @OuterLooper INT = 1, @MaxWordCount INT = (SELECT
MAX([UpperNumber]) FROM @NumberTable) + 1
    DECLARE @OldLow INT = 0, @OldHigh INT = 0
    DECLARE @LowCounter INT, @HighCounter INT, @InnerLooper INT
    WHILE @OuterLooper < @MaxWordCount
    BEGIN
            -- for a given word count, find the minimum and maximum
table numbers that this word count can be reside
            SELECT @LowCounter = MIN([TableCounter]), @HighCounter =
MAX([TableCounter])
            FROM @NumberTable WHERE @OuterLooper BETWEEN [LowerNumber]
AND [UpperNumber]
            -- if either @LowCounter or @HighCounter has changed
            IF (@OldLow != @LowCounter OR @OldHigh != @HighCounter)
            BEGIN
                IF @OuterLooper = 1
                    SET @createSPCmd = @createSPCmd +          '          IF
@WordCount <= ' + Convert(VARCHAR, @OuterLooper) + CHAR(13) + CHAR(10)
                ELSE
                    SET @createSPCmd = @createSPCmd +          '          ELSE
IF @WordCount <= ' + Convert(VARCHAR, @OuterLooper) + CHAR(13) +
CHAR(10)
                SET @createSPCmd = @createSPCmd +    '          BEGIN' +
CHAR(13) + CHAR(10)
                SET @InnerLooper = @LowCounter
                -- for each of the table, create the
insert/update/delete SQL statement
                WHILE @InnerLooper <= @HighCounter
                BEGIN
                    SET @createSPCmd = @createSPCmd +    '
    INSERT INTO [StringData en-us-' + REPLACE(STR(@InnerLooper, 3) ,'
', '0') + ']' + '(StringDataId, String, StringHash, WordCount) '   +
CHAR(13) + CHAR(10)
                    SET @createSPCmd = @createSPCmd +          '
    VALUES(@StringDataId, @String, @StringHash, @WordCount)'   +
CHAR(13) + CHAR(10)
                    SET @InnerLooper = @InnerLooper + 1
                END
                SET @createSPCmd = @createSPCmd +    '        END' +
CHAR(13) + CHAR(10)
                SET @OldLow = @LowCounter
                SET @OldHigh = @HighCounter
            END
            -- move to the next table counter
            SET @OuterLooper = @OuterLooper + 1
    END
    -- create SQL statement for the last case
    SET @createSPCmd = @createSPCmd +          '        ELSE' + CHAR(13) +
CHAR(10)
    SET @createSPCmd = @createSPCmd +          '        BEGIN' + CHAR(13) +
CHAR(10)
    SET @createSPCmd = @createSPCmd +    '                INSERT INTO
[StringData en-us-' + REPLACE(STR(@LowCounter, 3) , ' ', '0') + ']' +
'(StringDataId, String, StringHash, WordCount) ' + CHAR(13) + CHAR(10)
    SET @createSPCmd = @createSPCmd +    '
    VALUES(@StringDataId, @String, @StringHash, @WordCount)' +
CHAR(13) + CHAR(10)
    SET @createSPCmd = @createSPCmd +          '        END' + CHAR(13) +
CHAR(10)
    SET @createSPCmd = @createSPCmd + '
END
'
    EXEC (@createSPCmd)
END
```

What is claimed is:

1. A computer-implemented method comprising:
processing an original table to provide a plurality of smaller horizontally partitioned tables, the partitioned tables being configured to allow at least some overlapping data records, wherein processing an original table to provide a plurality of smaller horizontally partitioned tables comprises:
estimating an average number of words per partitioned table; and
calculating lower and upper word count boundaries for each partitioned table; and
using query modification script to generate a query configured to work with the partitioned tables.

2. The computer-implemented method of claim 1, wherein the query modification script comprises SELECT query modification script.

3. The computer-implemented method of claim 1, wherein the query modification script comprises INSERT query modification script.

4. The computer-implemented method of claim 1, wherein the query modification script comprises DELETE query modification script.

5. The computer-implemented method of claim 1, wherein the query modification script comprises UPDATE query modification script.

6. The computer-implemented method of claim 1, wherein the partitioned tables are configured to enable full-text search queries.

7. The computer-implemented method of claim 1, wherein the partitioned tables are configured to enable SQL full-text search queries.

8. The computer-implemented method of claim 1, wherein estimating the average number of words per partitioned table comprises using the following formula: (total number of words in the original table)/(total number of partitions).

9. The computer-implemented method of claim 1, wherein calculating lower and upper word count boundaries for each partitioned table comprises ascertaining whether a percentage of total number of words divided by an average word count exceeds a defined parameter and, if so, starting a new partitioned table.

10. The computer-implemented method of claim 1, wherein using query modification script comprises creating and storing a linear-split SELECT procedure configured to enable full-text queries.

11. The computer-implemented method of claim 1, wherein using query modification script comprises creating and storing a linear-split SELECT procedure configured to enable full-text queries based on word count of an input string.

12. The computer-implemented method of claim 1, wherein using query modification script comprises creating and storing a binary-split SELECT procedure configured to enable full-text queries.

13. One or more computer readable storage memories comprising computer readable instructions which, when executed, implement a method comprising:
    processing an original table to provide a plurality of smaller horizontally partitioned tables, the partitioned tables being configured to allow at least some overlapping data records, wherein processing an original table to provide a plurality of smaller horizontally partitioned tables comprises:
    estimating an average number of words per partitioned table; and
    calculating lower and upper word count boundaries for each partitioned table; and
    using query modification script to generate a query configured to work with the partitioned tables.

14. The one or more computer readable storage memories of claim 13, wherein estimating the average number of words per partitioned table comprises using the following formula: (total number of words in the original table)/(total number of partitions).

15. The one or more computer readable storage memories of claim 13, wherein calculating lower and upper word count boundaries for each partitioned table comprises ascertaining whether a percentage of total number of words divided by an average word count exceeds a defined parameter and, if so, starting a new partitioned table.

16. The one or more computer readable storage memories of claim 13, wherein using query modification script comprises creating and storing a linear-split SELECT procedure configured to enable full-text queries.

17. The one or more computer readable storage memories of claim 13, wherein using query modification script comprises creating and storing a linear-split SELECT procedure configured to enable full-text queries based on word count of an input string.

18. The one or more computer readable storage memories of claim 13, wherein using query modification script comprises creating and storing a binary-split SELECT procedure configured to enable full-text queries.

* * * * *